US010408924B2

(12) United States Patent
Mheen et al.

(10) Patent No.: US 10,408,924 B2
(45) Date of Patent: Sep. 10, 2019

(54) OPTICAL RECEIVER AND LASER RADAR WITH SCAN OPERATION

(71) Applicant: ELECTRONICS AND TELECOMMUNICATIONS RESEARCH INSTITUTE, Daejeon (KR)

(72) Inventors: Bongki Mheen, Daejeon (KR); Hong-Seok Seo, Daejeon (KR); Min Hyup Song, Daejeon (KR); Gyu Dong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 176 days.

(21) Appl. No.: 15/299,651

(22) Filed: Oct. 21, 2016

(65) Prior Publication Data
US 2017/0261371 A1    Sep. 14, 2017

(30) Foreign Application Priority Data
Mar. 8, 2016 (KR) .................. 10-2016-0027861

(51) Int. Cl.
*G01S 7/481* (2006.01)
*G01J 1/44* (2006.01)
(Continued)

(52) U.S. Cl.
CPC ............... *G01S 7/4817* (2013.01); *G01J 1/44* (2013.01); *G01S 7/486* (2013.01); *G01S 7/4814* (2013.01);
(Continued)

(58) Field of Classification Search
CPC .......... G01J 1/44; G01J 1/0204; G01J 1/0403; G01J 2001/446; G01J 2001/4406;
(Continued)

(56) References Cited

U.S. PATENT DOCUMENTS 5,760,886 A * 6/1998 Miyazaki .................. B60T 7/22
180/169
6,133,989 A    10/2000 Stettner et al.
(Continued)

FOREIGN PATENT DOCUMENTS

| JP | 2004157044 A | * | 6/2004 |
| JP | 2004157044 A | * | 6/2004 |
| JP | 2005-184054 A |   | 7/2005 |

*Primary Examiner* — Que Tan Le
*Assistant Examiner* — Jennifer D Bennett
(74) *Attorney, Agent, or Firm* — Rabin & Berdo, P.C.

(57) ABSTRACT

There are provided an optical receiver and a laser radar including the same. The optical receiver includes a plurality of optical detecting units configured to convert an optical signal reflected from a target into an electrical signal and to output the electrical signal, a signal combiner configured to combine output signals of the plurality of light detecting regions, a plurality of switches provided between the plurality of optical detecting units and the signal combiner, and a controller configured to control the plurality of switches so that the plurality of optical detecting units are selectively connected to the signal combiner based on whether the optical signal to reflected from the target is input. Therefore, it is possible to make a module small, to improve stability and reliability, and to reduce a signal to noise ratio.

10 Claims, 11 Drawing Sheets

(51) Int. Cl.
  *G01S 7/486* (2006.01)
  *H04B 10/60* (2013.01)
  *G01S 17/42* (2006.01)
  *G01S 17/89* (2006.01)

(52) U.S. Cl.
  CPC .......... *G01S 7/4816* (2013.01); *G01S 7/4863* (2013.01); *G01S 17/42* (2013.01); *G01S 17/89* (2013.01); *H04B 10/60* (2013.01); *G01J 2001/4406* (2013.01); *G01S 7/4815* (2013.01)

(58) Field of Classification Search
  CPC ....... H04B 10/60; G01S 7/486; G01S 7/4817; G01S 7/4814; G01S 7/4816; G01S 7/4863; G01S 17/89; G01S 17/42; G01S 7/4815
  See application file for complete search history.

(56) References Cited

U.S. PATENT DOCUMENTS

| | | |
|---|---|---|
| 7,969,558 B2 | 6/2011 | Hall |
| 2006/0072099 A1* | 4/2006 | Hoashi .................... G01S 7/487 356/4.01 |
| 2013/0341486 A1 | 12/2013 | Oh et al. |
| 2015/0009485 A1 | 1/2015 | Mheen et al. |
| 2015/0204980 A1* | 7/2015 | Matsuura ................ G01S 17/10 356/4.01 |
| 2017/0199273 A1* | 7/2017 | Morikawa ............. G01S 7/4868 |
| 2017/0242102 A1* | 8/2017 | Dussan ................ G01S 7/4817 |

* cited by examiner

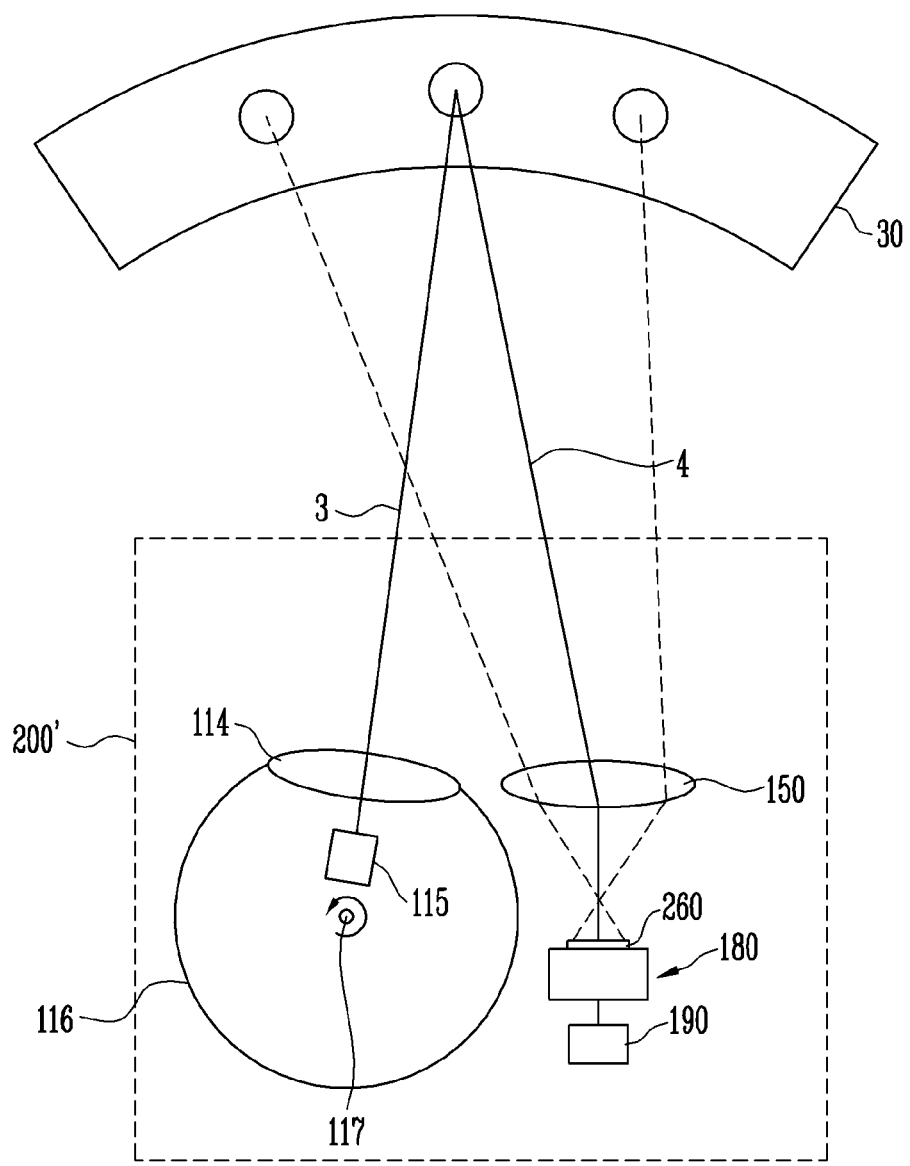

OPTICAL RECEIVER AND LASER RADAR WITH SCAN OPERATION

CROSS-REFERENCE TO RELATED APPLICATION

The present application claims priority to Korean patent application number 10-2016-0027861 filed on Mar. 8, 2016, the entire disclosure of which is incorporated herein in its entirety by reference.

BACKGROUND

1. Field

An embodiment of the present invention relates to an optical receiver and a laser radar including the same.

2. Description of the Related Art

Image obtaining apparatuses referred to as a laser radar, light detection and ranging (LIDAR), and a three-dimensional image sensor each includes an optical transmitter for transmitting pulse laser and an optical receiver for detecting a laser signal obtained by having the transmitted laser reflected from a target or a remote object and return. When a space is scanned by placing the optical transmitter and the optical receiver in one module and rotating or moving the optical transmitter and the optical receiver, a three-dimensional image of a peripheral object may be obtained.

In such a method, since both the optical transmitter and the optical receiver are to be moved, a size of the module is larger. Due to mechanical movement of the significant large module, reliability and stability deteriorate.

SUMMARY

An embodiment of the present invention relates to an optical receiver capable of changing a light receiving region without mechanical movement to make a module small, to improve reliability and stability, and to reduce a signal to noise ratio and a laser radar including the same.

An optical receiver according to an embodiment of the present invention includes a plurality of optical detecting units configured to convert an optical signal reflected from a target into an electrical signal and to output the electrical signal, a signal combiner configured to combine output signals of the plurality of light detecting regions, a plurality of switches provided between the plurality of optical detecting units and the signal combiner, and a controller configured to control the plurality of switches so that the plurality of optical detecting units are selectively connected to the signal combiner based on whether the optical signal reflected from the target is input.

An optical detecting unit to which the optical signal reflected from the target is input is predetermined based on a scan operation condition of a beam irradiated onto the target. The controller controls the plurality of switches so that the predetermined optical detecting unit to which the optical signal reflected from the target is input is connected to the signal combiner and connection between remaining optical detecting units and the signal combiner is blocked.

The optical receiver may further include a plurality of amplifiers connected to at least one of front ends and rear ends of the plurality of switches.

The signal combiner outputs electrical signals as many as optical signals simultaneously incident on the plurality of light detecting regions.

A laser radar according to an embodiment of the present invention includes an optical transmitter configured to irradiate an optical signal and to scan unit regions of a target and an optical receiver configured to detect optical signals reflected from unit regions of the target.

The optical receiver includes a plurality of optical detecting units configured to convert the optical signals reflected from the unit regions of the target into electrical signals and to output the electrical signals, a signal combiner configured to combine output signals of the plurality of light detecting regions, a plurality of switches provided between the plurality of optical detecting units and the signal combiner, and a controller configured to control the plurality of switches so that the plurality of optical detecting units are selectively connected to the signal combiner based on whether the optical signals reflected from the unit regions of the target are input.

The optical transmitter sequentially irradiates the unit regions of the target in accordance with a scan operation. An optical detecting unit to which the optical signal reflected from the target is input is predetermined based on the scan operation condition. The controller controls the plurality of switches so that the predetermined optical detecting unit to which the optical signal reflected from the target is input is connected to the signal combiner and connection between remaining optical detecting units and the signal combiner is blocked.

The scan operation condition includes at least one of a scan direction, a scan speed, and the number of optical signals simultaneously irradiated onto the unit regions of the target.

The optical receiver further includes a plurality of amplifiers connected to at least one of front ends and rear ends of the plurality of switches.

The plurality of optical detecting units respectively include photodiodes.

The optical transmitter simultaneously outputs a plurality of optical signals to scan the unit regions of the target. The optical combiner outputs electrical signals as many as optical signals simultaneously output from the optical transmitter.

According to the embodiment, the plurality of optical signals include a first optical signal and a second optical signal and the optical combiner may include a first combiner for adding an output signal for the first optical signal and a second combiner for adding an output signal for the second optical signal.

The first optical signal and the second optical signal may be input to at least one of the plurality of optical detecting units with time difference.

According to the embodiment, the plurality of switches may include at least one switch between the at least one optical detecting unit and the optical combiner.

According to the embodiment, the controller may control the at least one switch so that an output is input to the first combiner when the first optical signal is incident on the at least one optical detecting unit and is input to the second combiner when the second optical signal is incident on the at least one light detecting region.

According to the embodiment of the present invention, it is possible to prevent stability and reliability from deteriorating in accordance with mechanical movement, to reduce a signal to noise ratio, and to prevent reflected light components of adjacent laser radars from interfering one another.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 12 is a top view of the embodiment of FIG. 11.

DETAILED DESCRIPTION

Figure 1:
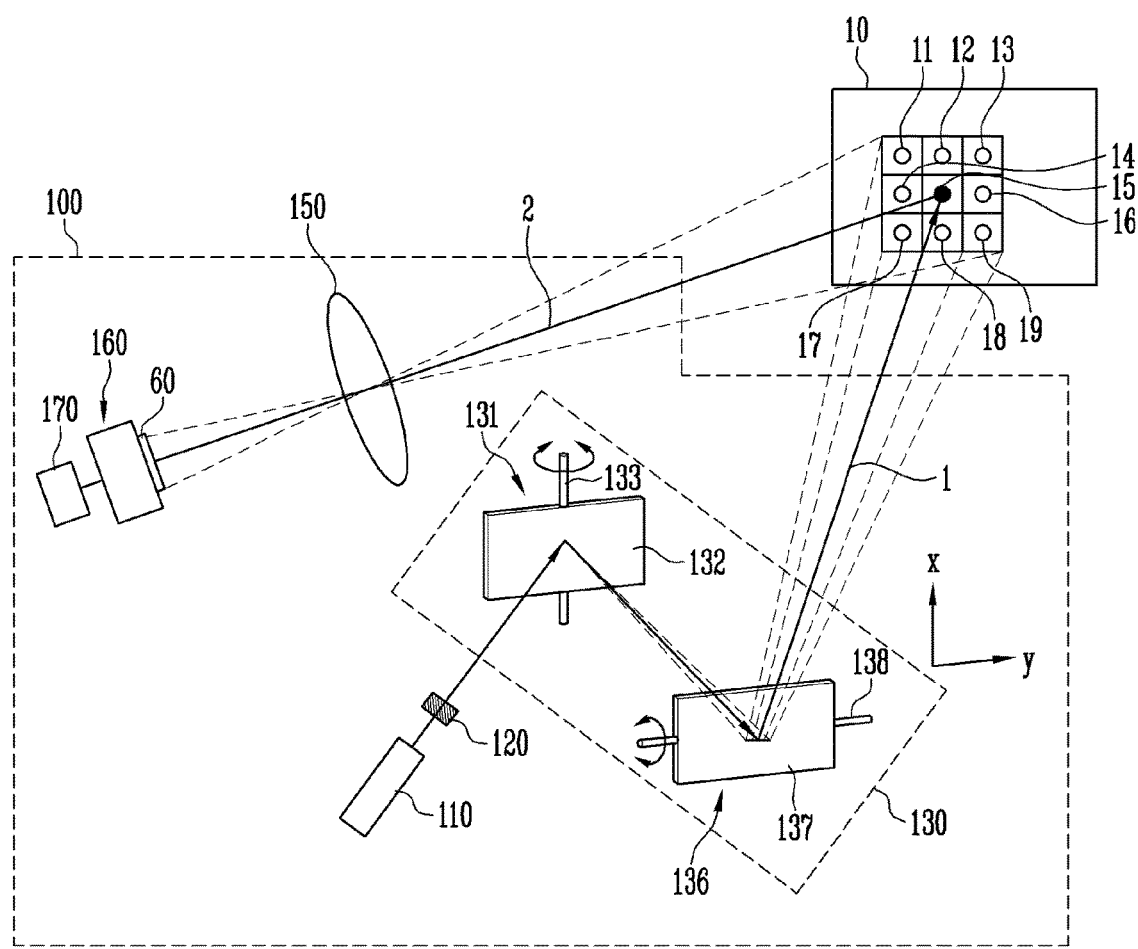
FIG. 1 is a block diagram of an optical receiver and a laser radar including the same according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Throughout this specification and the claims that follow, when it is described that an element is "connected" to another element, the element may be "directly connected" to the other element or "electrically connected" to the other element through a third element. In the accompanying drawings, a portion irrelevant to description of the present invention will be omitted for clarity. Like reference numerals refer to like elements throughout.

Hereinafter, embodiments will be described in detail so that those skilled in the art may easily perform the present invention with reference to the accompanying drawings.

Figure 2:
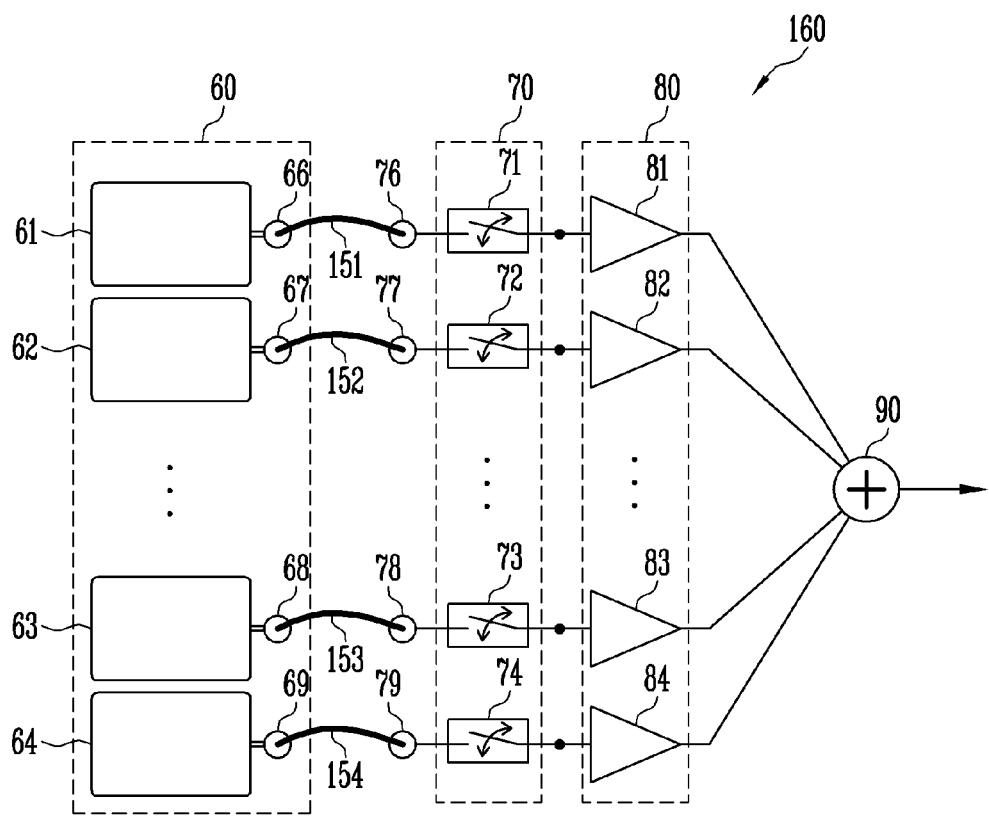
FIG. 2 is a block diagram of a signal processor provided in the optical receiver of the embodiment of FIG. 1.

FIG. 1 is a block diagram of an optical receiver and a laser radar including the same according to an embodiment of the present invention. FIG. 2 is a block diagram of a signal processor provided in the optical receiver of the embodiment of FIG. 1.

Optical receivers 150, 160, and 170 according to the embodiment of the present invention receive an optical signal 2 reflected from a target 10. A laser radar 100 according to the embodiment of the present invention includes optical transmitters 110, 120, and 130 for irradiating a laser beam 1 onto a plurality of unit regions of the target 10 and the optical receivers 150, 160, and 170.

In FIG. 1, unit regions of the target 10 are divided into nine, which is only exemplary. As occasion demands, the number of unit regions may be added or reduced. In addition, in FIG. 1, the unit regions of the target 10 are arranged in 3×3, which is only exemplary. As occasion demands, the number of unit regions arranged in a row and a column may be added or reduced.

The optical transmitters 110, 120, and 130 may sequentially irradiate the laser beam 1 onto the divided unit regions 11, 12, 13, 14, 15, 16, 17, 18, and 19. The optical transmitters 110, 120, and 130 include a light source 110, a module 120 for controlling a width of the laser beam output from the light source 110, and an optical signal deflector 130.

The light source 110 may be pulse laser. However, the present invention is not limited thereto. The optical signal output from the light source 110 may be a continuous wave. The module 120 may be an optical system including at least one lens or a diffuser. As occasion demands, the module 120 may be omitted. According to the present embodiment, one light source 110 is provided. However, the present invention is not limited thereto. A plurality of light sources may be provided.

The laser beam 1 that is output from the light source 110 and that passes through the module 120 is sequentially irradiated onto the plurality of unit regions 11, 12, 13, 14, 15, 16, 17, 18, and 19 by the optical signal deflector 130. The optical signal deflector 130 includes a first mirror 131 that rotates about an x axis and a second mirror 136 that rotates about a y axis. The target 10 may be two-dimensionally scanned by the optical signal deflector 130.

The first mirror 131 irradiates the laser beam 1 onto the second mirror 136 while a mirror 132 including a first rotation axis 133 that runs parallel with the x axis repeatedly rotates. The second mirror 136 sequentially reflects the laser beam 1 incident from the first mirror 131 to the plurality of unit regions of the target 10 while a mirror 137 including a second rotation axis 138 that runs parallel with the y axis repeatedly rotates. Although not shown, the optical signal deflector 130 further includes a driving unit for rotating the first mirror 131 and the second mirror 136.

The optical transmitter may further include a controller (not shown) for controlling operations of the first and second mirrors 131 and 136. The optical transmitter may further include an input unit (not shown) for receiving information items on the controlling of an operation of the optical signal deflector 130.

The optical signal deflector 130 of FIG. 1 is only an embodiment and the present invention is not limited thereto. Any configuration capable of reflecting the laser beam 1 output from the light source 110 and two-dimensionally or three-dimensionally scanning the target 10 may be used for the optical signal deflector.

The optical receivers 150, 160, and 170 include a light receiving optical system 150, a signal processor 160 for converting the optical signal reflected from the target 10 into an electrical signal and outputting the electrical signal, and a controller 170 for controlling a plurality of switches 70 of the signal processor 160.

The light receiving optical system 150 focuses the optical signal 2 incident at a large angle by the signal processor 160.

An optical detector 60 of the signal processor 160 may be positioned within a focusing distance of the light receiving optical system 150. According to the current embodiment, the light receiving optical system 150 is one convex lens. However, the present invention is not limited thereto.

The signal processor 160 converts the optical signals 2 sequentially reflected from the plurality of unit regions of the target 10 and input to a plurality of optical detecting units 61, 62, 63, and 64 into electrical signals, combines the electrical signals, and outputs an electrical signal.

According to the current embodiment, since one light source 110 is provided, only one electrical signal is output to the signal processor 160. However, the present invention is not limited thereto. The number of output signals of the signal processor is determined in accordance with the number of light sources. For example, when the number of light sources of the optical transmitter is two, the number of electrical signals output from the signal processor is two.

The signal processor 160 includes the optical detector 60 for converting the optical signals 2 reflected from the target 10 into the electrical signals, a signal combiner 90 for combining the plurality of electrical signals output from the optical detector 60, and the plurality of switches 70 for selectively connecting the plurality optical detecting units 61, 62, 63, and 64 of the optical detector 60 and the signal combiner 90.

The optical detector 60 includes the plurality of optical detecting units 61, 62, 63, and 64 for converting the input optical signals into the electrical signals and a plurality of light detecting output ports 66, 67, 68, and 69 provided in the plurality of optical detecting units 61, 62, 63, and 64.

The plurality of optical detecting units may include N optical detecting units, a first channel optical detecting unit 61, a second channel optical detecting unit 62 through an (N−1)th channel optical detecting unit 63, and an Nth channel optical detecting unit 64. N is an integer.

The electrical signals converted by the plurality of optical detecting units 61, 62, 63, and 64 are input to the signal combiner 90 through the plurality of light detecting output ports 66, 67, 68, and 69.

The plurality of optical detecting units 61, 62, 63, and 64 correspond to optical detecting regions obtained by dividing an entire incidence region of the optical signal 2 reflected from the target 10. When the divided optical detecting units are obtained, a large region may be scanned without increase in output capacitance so that short laser pulse may be detected. The optical detecting units 61, 62, 63, and 64 need not correspond to the unit regions of the target 10 one by one.

The plurality of optical detecting units 61, 62, 63, and 64 may be unit light detectors, for example, photodiodes.

Figure 3:
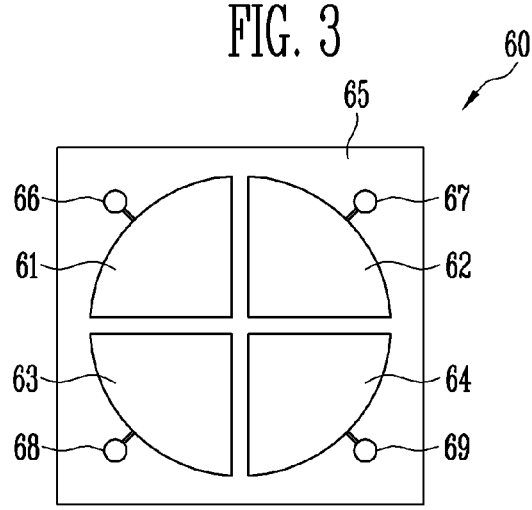
FIG. 3 is a front view illustrating an embodiment of an optical detector provided in the embodiment of FIG. 1.

FIG. 3 is a front view illustrating an embodiment of an optical detector provided in the embodiment of FIG. 1. In the optical detector 60 of FIG. 3, the four optical detecting units 61, 62, 63, and 64 are provided on a substrate 65. The four optical detecting units 61, 62, 63, and 64 are obtained by dividing a circular light receiving region into four and are arranged in 2×2. The light detecting output ports 66, 67, 68, and 69 are respectively arranged outside the optical detecting units 61, 62, 63, and 64.

The optical detector 60 of FIG. 3 is only an embodiment and the present invention is not limited thereto. A size or shape of an entire light receiving region obtained by combining the plurality of optical detecting units may vary in accordance with a shape of a target of which an image is to be obtained. In addition, areas, shapes, and an arranging method of the plurality of optical detecting units and the number of optical detecting units may vary.

The signal combiner 90 receives output signals of the plurality of optical detecting units 61, 62, 63, and 64 through N input ports 76, 77, 78, and 79 respectively corresponding to the N light detecting output ports 66, 57, 68, and 69, combines the plurality of input electrical signals, and outputs one electrical signal. The N light detecting output ports 66, 57, 68, and 69 and the N input ports 76, 77, 78, and 79 may be electrically connected by N wires 151, 152, 153, and 154, respectively.

The plurality of switches 70 are provided in each of the N input ports 76, 77, 78, and 79 and selectively connect the N optical detecting units 61, 62, 63, and 64 to the signal combiner 90. The plurality of switches 70 include a first channel switch 71, a second channel switch 72 through an (N−1)th channel switch 73, and an Nth channel switch 74.

The controller 170 controls the N switches 70 so that the output signals of the plurality of optical detecting units are selectively input to the signal combiner 90. For example, the controller 170 closes the first channel switch 71 and opens the switches 72, 73, and 74 of the remaining channels so that only the output signal of the first channel optical detecting unit 61 may be input to the signal combiner 90 or closes the first and second channel switches 61 and 62 and opens the remaining switches so that the output signal of the first channel optical detecting unit 61 and the output signal of the second channel optical detecting unit 62 may be input to the signal combiner 90.

The controller 170 controls the plurality of switches 70 based on the presence of the optical signal 2 reflected from the target 10. As described above, the optical transmitters 110, 120, and 130 two-dimensionally scan the target 10 by the optical signal deflector 130. An irradiating position of the laser beam 1 varies in accordance with rotations of the first mirror 131 and the second mirror 136. Therefore, with the lapse of time, an optical detecting unit to which the optical signal 2 reflected from the target 10 is actually input among the plurality of optical detecting units changes. The controller 170 controls the plurality of switches 70 so that the optical detecting unit to which the optical signal 2 is actually input is connected to the signal combiner 90 and an optical detecting unit to which the optical signal 2 is not input is not connected to the signal combiner 90 based on the position of the incidence region of the optical signal 2 that varies in accordance with the scan operation of the light transmitter.

Since the optical detecting unit on which the optical signal 2 reflected from the target 10 is incident changes with the lapse of time and is determined in accordance with a scan direction or a scan speed of the optical transmitter, the controller 170 may control the plurality of switches 70 based on a scan operation of the optical signal deflector 130.

Specifically, the scan direction, a scan range, and the scan speed of the optical transmitter may be determined based on a rotation speed, a rotation direction, and a rotation radius of the first mirror 131 and a rotation speed, a rotation direction, and a rotation radius of the second mirror 136. An incidence position of the optical signal 2 reflected from the target 10 may be determined by time zone based on the scan direction, the scan range, and the scan speed of the optical transmitter.

The controller 170 may indirectly distinguish the optical detecting unit on which the optical signal 2 reflected from the target 10 is actually incident from the optical detecting unit on which the optical signal 2 reflected from the target 10 is not incident based on the incidence position of the determined optical signal 2. The controller 170 closes a switch of a corresponding channel and opens switches of the other channels with the lapse of time so that only the output signal of the optical detecting unit on which the optical signal 2 is incident may be input to the signal combiner 90.

The channel of the optical detecting unit corresponding to the determined incidence position of the optical signal 2 may be determined by time zone. A method determined based on the channel of controlling a plurality of switches may be input to the controller 170. The controller 170 may receive the method of controlling the plurality of switches from a memory in which methods of controlling the plurality of switches in accordance with at least one scan mode of the optical transmitter and the incidence position of the optical signal 2 determined by scan mode are stored. When the scan mode of the optical transmitter is determined, the method of controlling the plurality of switches of the controller is determined.

The controller 170 determines whether the optical signal 2 is incident on the plurality of optical detecting units in real time and may connect only the optical detecting unit of the corresponding channel to the signal combiner 90. Whether the optical signal 2 reflected from the target 10 is incident on the plurality of optical detecting units may be determined by various methods.

The controller 170 controls the plurality of switches 70 and connects at least one optical detecting unit on which the optical signal 2 is incident with the lapse of time to the signal combiner 90. For example, until t seconds have passed after the laser beam 1 is output from the light source 110, the optical signal 2 may not be input to all the optical detecting units 61, 62, 63, and 64. At this time, the controller 170 opens all the switches 71, 72, 73, and 74 so that the optical signal 2 is not input to the signal combiner 90.

After the t seconds have passed after the laser beam 1 is output from the light source 110, for α seconds, the optical signal 2 may be input only to the first channel optical detecting unit 61. At this time, the controller 170 closes the first channel switch 71 and opens the remaining switches 72, 73, and 74 for the a seconds so that only the output signal of the first channel optical detecting unit 61 is input to the signal combiner 90.

After t+α seconds have passed after the laser beam 1 is output from the light source 110, for β seconds, the optical signal 2 may be simultaneously input to the first and second channel optical detecting units 61 and 62. In such a method, at a certain point of time, the optical signal 2 may be simultaneously incident on the optical detecting units of various channels. The optical signal 2 may be input only to the second channel optical detecting unit 62. At this time, the controller 170 closes a switch of a corresponding channel of at least one optical detecting unit to which the optical signal 2 is input and opens switches of remaining channels so that only an output signal of the optical detecting unit of the corresponding channel is input to the signal combiner 90.

As described above, since the number of optical detecting units and arrangement of the plurality of optical detecting units are various, the number of optical detecting units on which the optical signal 2 is simultaneously incident by time zone and positions of the optical detecting units on which the optical signal 2 is simultaneously incident by time zone are various.

The signal processor 160 may further include N rear end amplifiers 80 provided between output ends of the N switches 70 and the signal combiner 90. The N rear end amplifiers 80 include a first channel rear end amplifier 81, a second channel rear end amplifier 82 through (N−1)th channel rear end amplifier 83, and an Nth channel rear end amplifier 84.

The plurality of rear end amplifiers 80 amplify an electrical signal input to the signal combiner 90 when corresponding switches are closed. It is possible to prevent the electrical signal from being reflected or distorted without being input to the signal combiner 90 by the plurality of rear end amplifiers 80 and to implement a highly sensitive optical receiver. The plurality of rear end amplifiers 80 may be low noise amplifiers. The plurality of rear end amplifiers 80 may be omitted as occasion demands.

Figure 4:
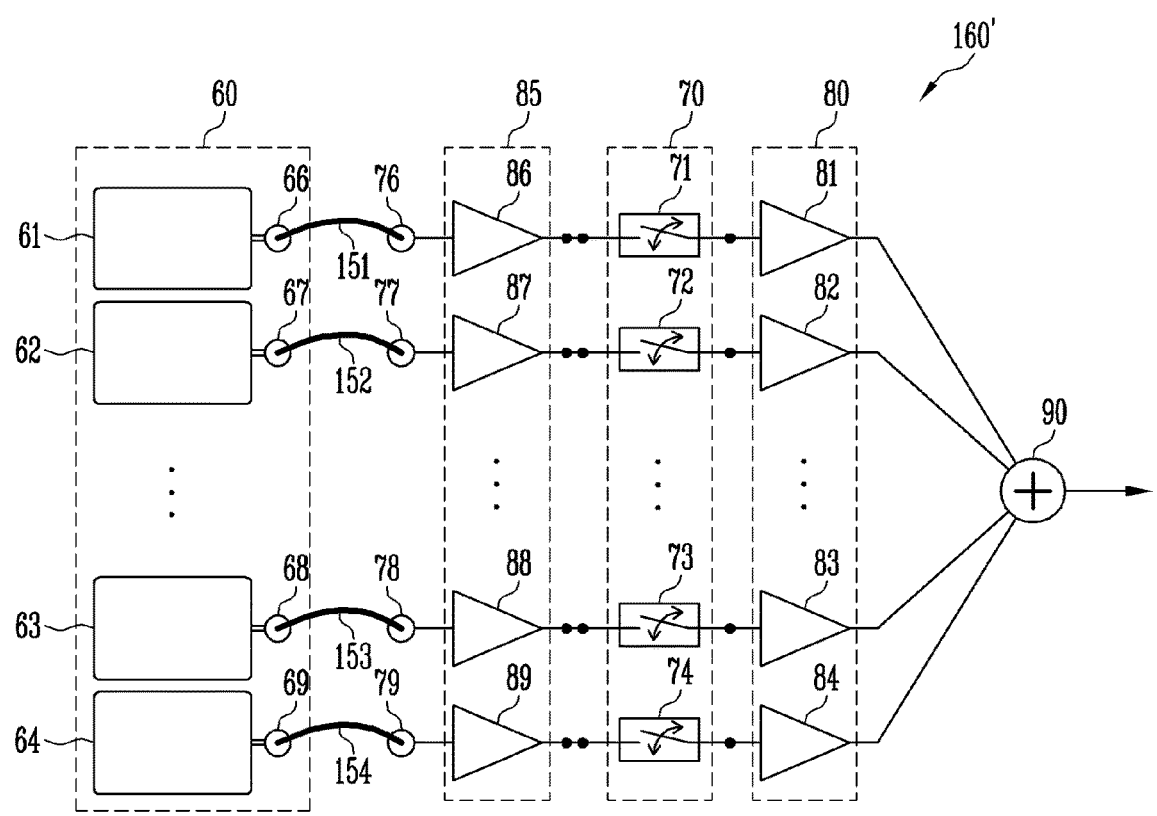
FIG. 4 is a block diagram of a signal processor according to another embodiment.

FIG. 4 is a block diagram of a signal processor 160' according to another embodiment. The signal processor 160' according to another embodiment further includes N front end amplifiers 85 electrically connected between the input ports 76, 77, 78, and 79 by channel of the signal processor 160 of FIG. 2 and input ends of the N switches 70. Noise may increase due to the switches 70. A signal to noise ratio may be reduced by adding the front end amplifiers 85.

The N front end amplifiers 85 amplify electrical signals respectively input to the N channel input ports 76, 77, 78, and 79. The plurality of front end amplifiers 85 may be low noise amplifiers. The plurality of front end amplifiers 85 reduce capacitance increased by the plurality of switches 70.

In the embodiment of FIG. 4, the plurality of front end amplifiers 85 and the rear end amplifiers 80 may be omitted as occasion demands. As occasion demands, the plurality of front end amplifiers 85 are provided and the rear end amplifiers 80 may be omitted.

Figure 5:
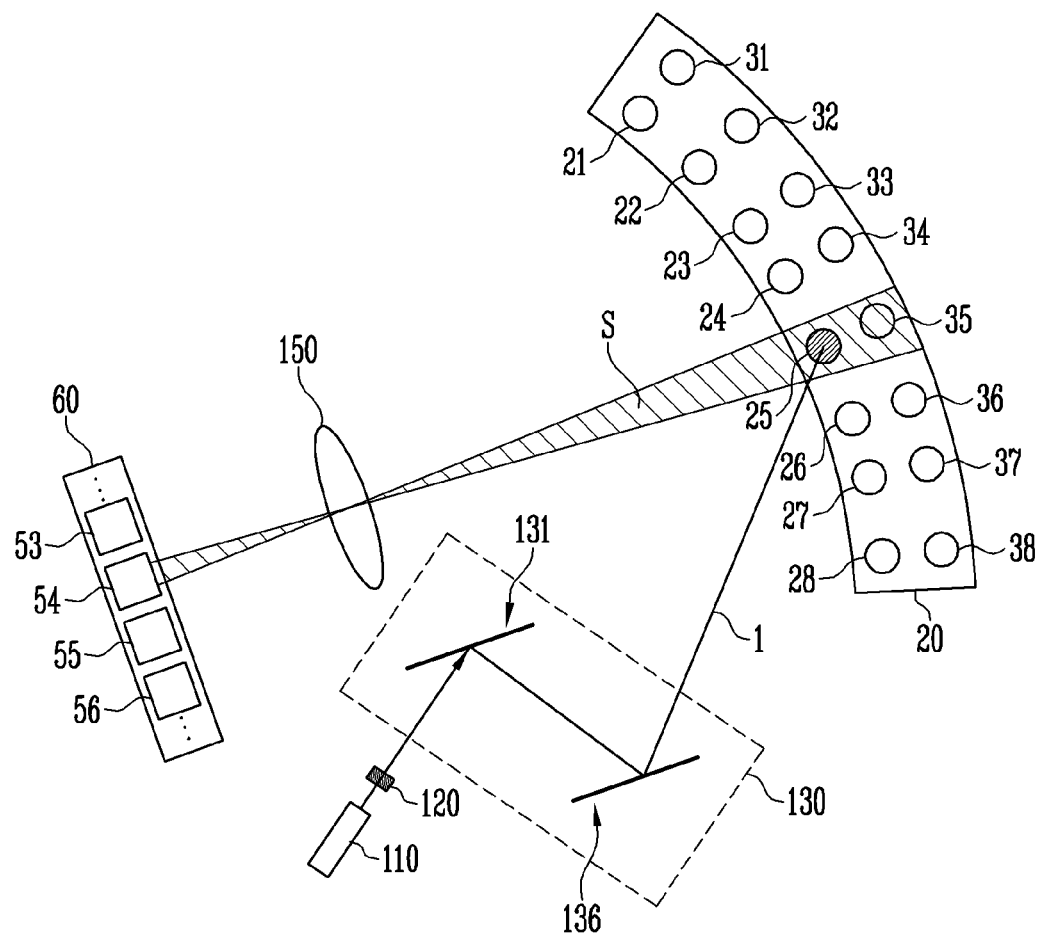
FIG. 5 illustrates an operation state of the laser radar of the embodiment of FIG. 1.

An operation state of the laser radar of the embodiment of FIG. 1 will be described in detail with reference to FIG. 5. In the optical receiver of the embodiment of FIG. 1, for convenience sake, only the light receiving optical system 150 and the optical detector 60 are illustrated. The optical detector 60 includes N light detecting regions. However, for convenience sake, only four optical detecting units 53, 54, 55, and 56 are illustrated. The four optical detecting units illustrated in the optical detector of FIG. 5 are referred to as an (M−3)th channel optical detecting unit 53, an (M−2)th channel optical detecting unit 54, an (M−1)th channel optical detecting unit 55, and an Mth channel optical detecting unit 56. Here, M is an arbitrary integer larger than 4 and smaller than N.

The laser beam 1 output from the light source 110 passes through the module 120 for controlling a width of the optical signal and is incident on the first mirror 131 of the optical signal deflector 130. The laser beam 1 incident on the first mirror 131 is reflected to the second mirror 136 and is irradiated onto the target 20. When it is assumed that the target 20 is formed of a plurality of unit regions arranged in two columns, the optical signal deflector 130 is controlled so that first through eighth unit regions 21, 22, 23, 24, 25, 26, 27, and 28 in a lower end column and first through eighth unit regions 31, 32, 33, 34, 35, 36, 37, and 38 in an upper end column may be sequentially scanned.

Referring to FIG. 5, the laser beam 1 that passes through the optical signal deflector 130 of the optical transmitter is irradiated onto the fifth unit region 25 in the lower end column at an arbitrary point of time. The optical detecting unit on which optical signals S reflected from the fifth unit region 25 in the lower end column are incident is the (M−2)th channel optical detecting unit 54. At this time, the optical signals are not incident on the (M−3)th, (M−1)th, and Mth channel optical detecting units 53, 55, and 56. Therefore, the controller 170 closes the (M2)th channel switch and opens the remaining channel switches while the laser beam 1 output from the optical transmitter is incident on the fifth unit region 25 in the lower end column of the target 20 so that only an electrical signal output from the (M−2)th channel optical detecting unit 54 may be input to the signal combiner 90.

In FIG. 5, it is illustrated that one channel optical detecting unit corresponds to one unit region of the target. However, the present invention is not limited thereto. Actually, the optical signals reflected from the plurality of unit regions of the target may be simultaneously input to an optical detecting unit of one channel and an optical signal reflected from one unit region of the target may be simultaneously input to optical detecting units of various channels. The switches of the respective channels are controlled based on the scan operation of the optical transmitter by the above method so that only the output signal of the optical detecting unit on which the optical signal is actually incident may be input to the signal combiner 90.

In the above configuration, the switch of the channel to which the optical signal is not actually input is opened so that the output signal of the optical detecting unit of the channel to which the optical signal is not input is blocked. Therefore, the signal to noise ratio is reduced. In addition, since a light receiving region (a region on which the optical signal reflected from the target is actually incident) changes due to electrical switching, it is not necessary to mechanically move the optical receiver and to prevent stability and reliability from deteriorating in accordance with the mechanical movement.

In order to rapidly scan a large region, the laser radar may be configured by arranging a plurality of optical transmitters and a plurality of optical receivers. For example, the optical transmitters and the optical receivers may be arranged so that the optical transmitters 110, 120, and 130 of FIG. 5 scan the target 20 of FIG. 5 and another optical transmitter (not shown) scans a left region of the target 20 of FIG. 5. In such a case, optical signals reflected from adjacent scan regions may be simultaneously input to the plurality of light detecting units 60. However, the optical signal of the other optical transmitter may be blocked by the above-described electrical switching.

For example, while the laser beam 1 is irradiated onto the fifth unit region 25 by the first optical transmitters 110, 120, and 130 in the lower end of FIG. 5, only an output signal of the (M−2)th channel optical detecting unit 54 is input to the signal combiner and 90 and connection between the remaining optical detecting units 53, 55, and 56 and the signal combiner 90 is blocked. Therefore, when laser beam of a second light transmitter (not shown) is irradiated on the first unit region 21 in the lower end of the target 20, a signal caused by reflected light is not input to the signal combiner 90. Therefore, although various optical transmitters and optical receivers are arranged, since a large area may be rapidly scanned without the optical transmitters and optical receivers from interfering one another, it is possible to increase a processing speed and to improve reliability.

Figure 6:
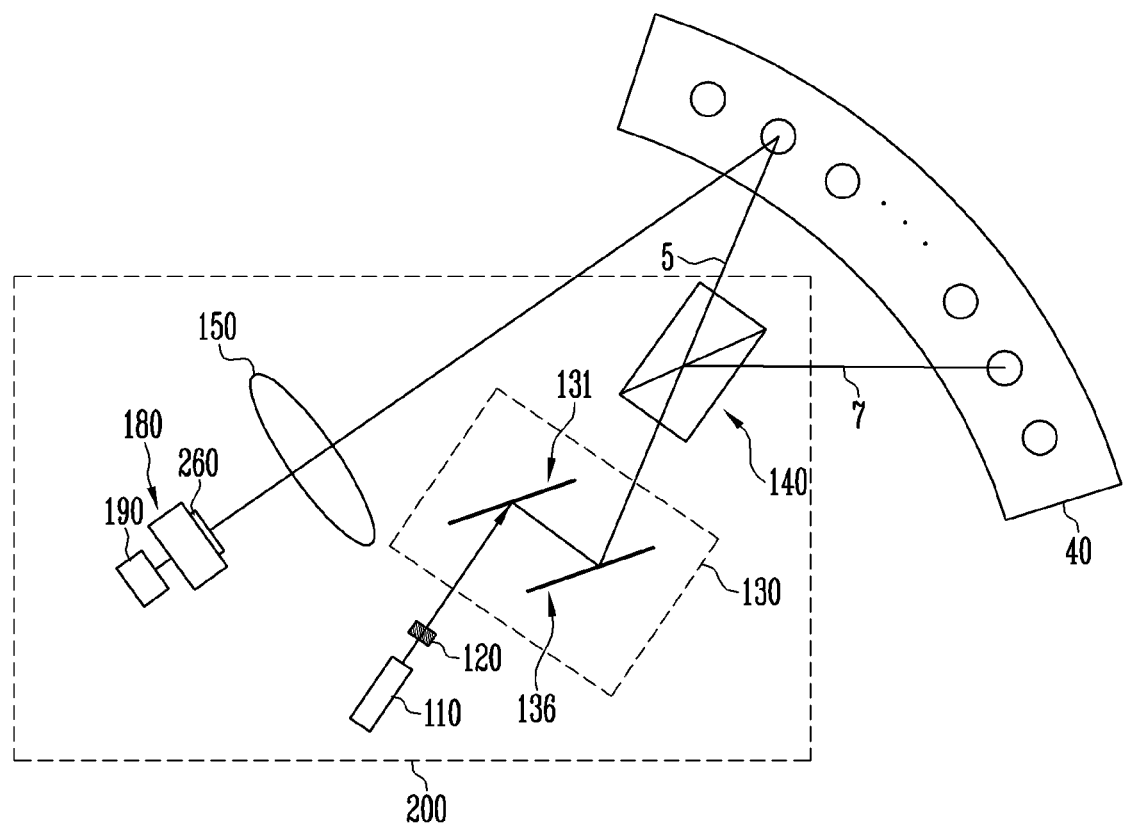
FIG. 6 is a block diagram of an optical receiver and a laser radar including the same according to another embodiment of the present invention.
Figure 7:
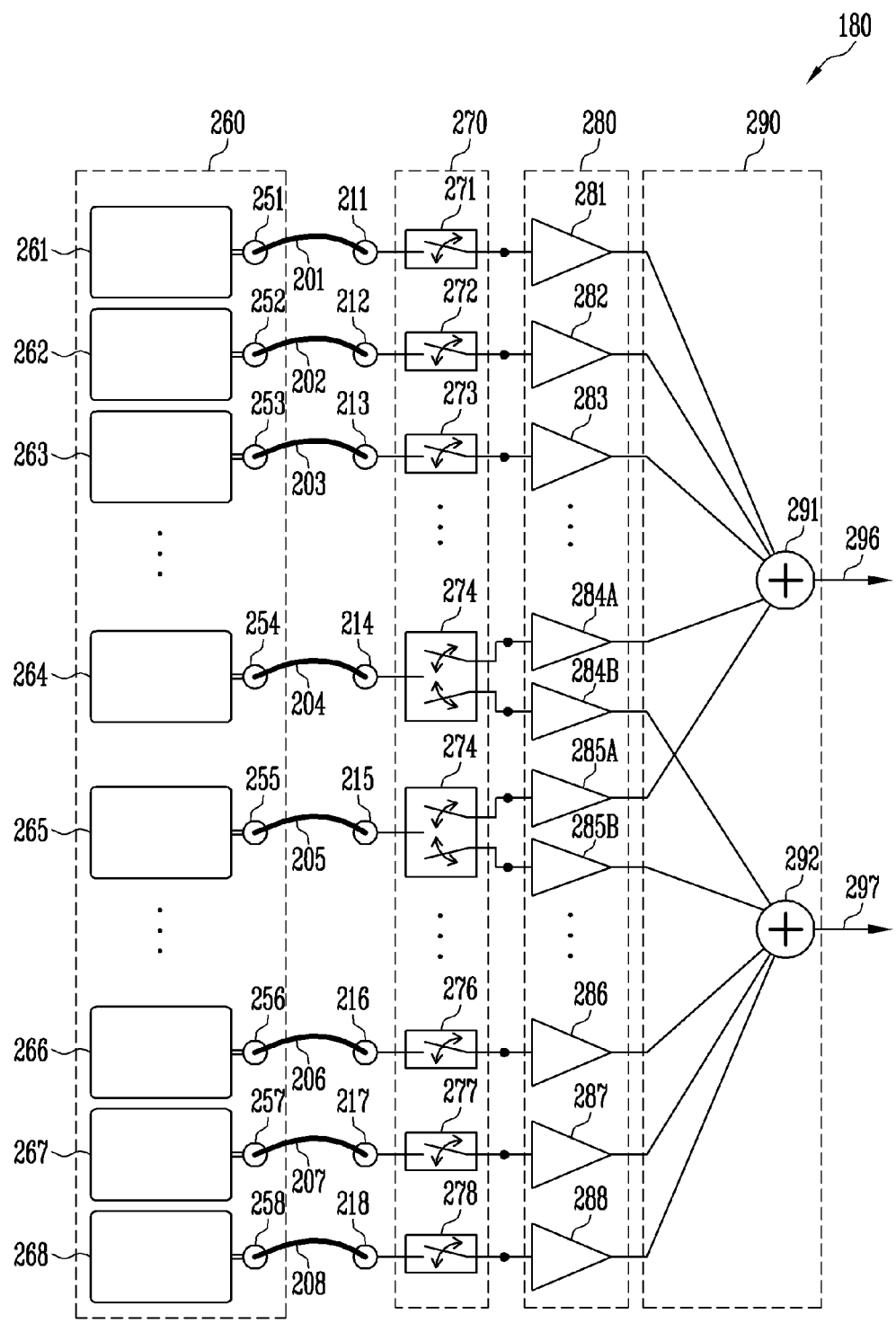
FIG. 7 is a block diagram of a signal processor provided in the optical receiver of the embodiment of FIG. 6.

FIG. 6 is a block diagram of an optical receiver and a laser radar including the same according to another embodiment of the present invention. FIG. 7 is a block diagram of a signal processor provided in the optical receiver of the embodiment of FIG. 6.

Optical receivers 150, 180, and 190 according to another embodiment of the present invention receive an optical signal reflected from a target 40. A laser radar 200 according to another embodiment of the present invention includes optical transmitters 110, 120, 130, and 140 for irradiating two laser beams 5 and 7 onto a plurality of unit regions of the target 40 and the optical receivers 150, 180, and 190.

In FIG. 6, it is illustrated that the laser beam 5 of the two laser beams 5 and 7 is reflected from the unit regions of the target 40 and is input to the optical receivers 150, 180, and 190. The beams are simply illustrated in order to describe a configuration of the present invention. Actually, optical signals obtained by reflecting the second laser beam 7 from the unit regions of the target 40 may also be input to the optical receivers 150, 180, and 190, which will be described in detail hereinafter.

The optical transmitters 110, 120, 130, and 140 of FIG. 6 are obtained by adding the optical splitter 140 to the optical transmitters 110, 120, and 130 of FIG. 1. Since configuration of the light source 110, the module 120, and the optical signal deflector 130 is described in detail, detailed description thereof will not be given.

Figure 9:
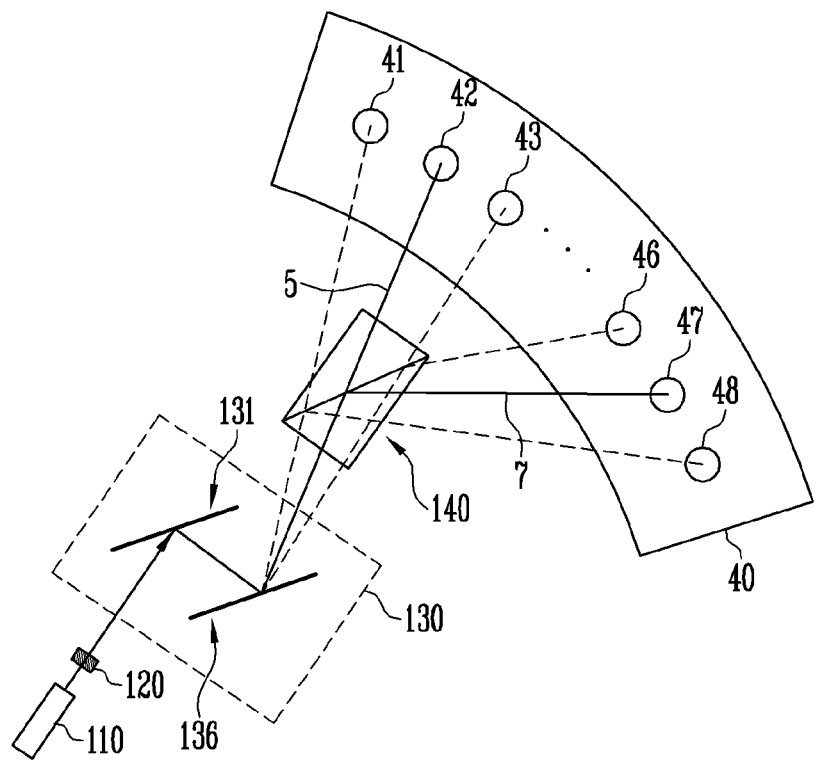
FIG. 9 illustrates an operation state of the optical transmitter of the embodiment of FIG. 6.

The laser beam that passes through the first and second mirrors 131 and 136 of the optical signal deflector 130 is divided into the two laser beams 5 and 7 by the optical splitter 140 and the two laser beams 5 and 7 are simultaneously irradiated onto the two unit regions of the target 40. In FIG. 9, it is illustrated in detail that the laser beam is divided into the two laser beams 5 and 7 by the optical splitter 140.

Referring to FIG. 9, with the lapse of time, the laser beam is irradiated onto another position of the optical splitter 140 by the scan operation of the optical signal deflector 130. The two laser beams 5 and 7 divided by the optical splitter 140 two-dimensionally scan the respective unit regions 41, 42, 43, 46, 47, and 78 of the target 40 while moving together in a scan direction.

According to the current embodiment, the optical splitter 140 divides one incident laser beam into the two laser beams 5 and 7. However, the present invention is not limited thereto. The optical splitter may have any configuration in which the incident laser beam may be divided into no less than two and the divided laser beams may be irradiated. The optical splitter may be a beam splitter, a dichroic beam splitter (DBS), or another optical module having a similar function.

The optical receivers 150, 180, and 190 include the light receiving optical system 150, the signal processor 180 for converting the optical signal reflected from the target 40 into an electrical signal and outputting the electrical signal, and the controller 190 for controlling a plurality of switches 270 of the signal processor 180.

Figure 10:
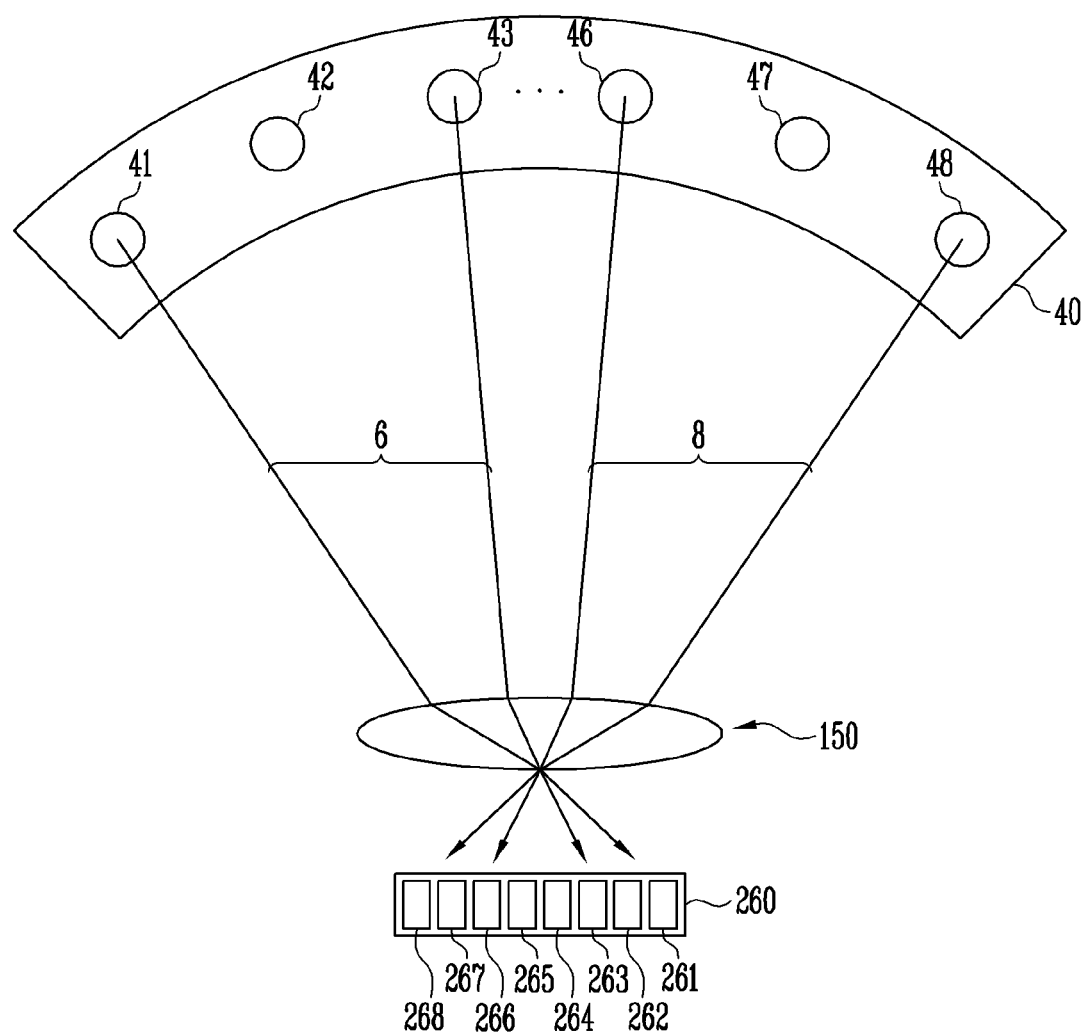
FIG. 10 illustrates an operation state of the optical receiver of the embodiment of FIG. 6.

In FIG. 10, it is illustrated in detail that optical signals 6 and 8 reflected from the respective unit regions 41, 42, 43, 44, 45, and 46 of the target 40 are input to an optical detector 260. The optical signals 6 and 8 are obtained by simultaneously irradiating the laser beams 5 and 7 irradiated by the optical receiver of FIG. 9 onto the target 40 and reflecting the irradiated laser beams 5 and 7. For convenience sake, in FIG. 9, the two laser beams irradiated onto the target 40 are referred to as the first irradiated light 5 and the second irradiated light 7 and, in FIG. 10, the two optical signals reflected from the target 40 are referred to as the first reflected light 6 and the second reflected light 8. The first reflected light 6 is obtained by reflecting the first irradiated light 5 from the respective unit regions of the target 40 and the second reflected light 8 is obtained by reflecting the second irradiated light 7 from the respective unit regions of the target 40.

The light receiving optical system 150 focuses the first and second reflected lights 6 and 8 on the signal processor 180. Since the light receiving optical system 150 is the same as the light receiving optical system 150 provided in the embodiment of FIG. 1, detailed description thereof will not be given.

The signal processor 180 converts optical signals sequentially reflected from the plurality of unit regions of the target 40 and input to a plurality of optical detecting units 261 through 268 into electrical signals, combines the electrical signals, and outputs electrical signals as many as light components obtained by dividing the irradiated light by the optical splitter 140. According to the current embodiment, since the optical splitter 140 divides the irradiated light into two, two electrical signals 296 and 297 are output from the signal processor 180.

The signal processor 180 includes the optical detector 260 on which the first and second reflected light components 6 and 8 reflected from the target 40 are incident and in which the first and second reflected light components 6 and 8 are converted into the electrical signals, a signal combiner 290 for adding the plurality of electrical signals output from the optical detector 260, and the plurality of switches 270 for selectively connecting a plurality of optical detecting units 261, 262, 263, 264, 265, 266, 267, and 268 of the optical detector 260 and the signal combiner 290.

The optical detector 260 includes the plurality of optical detecting units 261, 262, 263, 264, 265, 266, 267, and 268 for converting the input optical signals into the electrical signals and a plurality of light detecting output ports 251, 252, 253, 254, 255, 256, 257, and 258 provided in the plurality of light detecting regions.

The plurality of optical detecting units may include N light detecting regions, that is, the first channel optical detecting unit 261, the second channel optical detecting unit 262, the third channel optical detecting unit 263 through the (M−1)th channel optical detecting unit 264, the M channel optical detecting unit 265 through the (N−2)th channel optical detecting unit 266, the (N−1)th channel optical detecting unit 267, and the Nth channel optical detecting unit 268. Here, N is an integer and M is an integer smaller than N.

According to the current embodiment, it is illustrated that the number of optical detecting units is no less than 8. However, the present invention is not limited thereto. The number of optical detecting units may be increased or reduced as occasion demands.

The plurality of optical detecting units 261 through 268 are unit detecting regions obtained by dividing an entire incidence region of the optical signals 6 and 8 reflected from the target 40 into N. When the plurality of optical detecting units are obtained, a large region may be scanned without increase in output capacitance so that short laser pulse may be detected. The optical detecting units 261 through 268 need not correspond to the unit regions of the target 40 one by one.

The plurality of optical detecting units 261 through 268 may be unit light detectors, for example, photodiodes.

The plurality of optical detecting units may be divided into regions to which the first reflected light 6 is input and regions to which the second reflected light 8 is input. For example, the first through Mth channel optical detecting units 261, 262, 263, 264, and 265 are arranged in the region to which the first reflected light 6 is input and the (M−1)th through Nth channel optical detecting units 264, 265, 266, 267, and 268 may be arranged in the region to which the second reflected light 8 is input. At this time, the (M−1)th channel optical detecting unit 264 and the Mth channel optical detecting unit 265 may be positioned on a boundary between the incidence region of the first reflected light 6 and the incidence region of the second reflected light 8. Both the first reflected light 6 and the second reflected light 8 may be input with time difference.

The electrical signals converted by the plurality of optical detecting units 261 through 268 are input to the signal combiner 290 through the plurality of light detecting output ports 251 through 258. The signal combiner 290 includes a first combiner 291 for adding the electrical signals in accordance with the first reflected light 6 and outputting an obtained signal and a second combiner 292 for adding the electrical signals in accordance with the second reflected light 8 and outputting an obtained signal.

As described above, both the first reflected light 6 and the second reflected light 8 may be input to the optical detecting units 264 and 265 positioned on the boundary between the incidence region of the first reflected light 6 and the incidence region of the second reflected light 8 with time difference. Therefore, the (M−1)th channel optical detecting unit 264 and the Mth channel optical detecting unit 265 are connected to each of the first combiner 291 and the second combiner 292. When output signals of the (M−1)th channel optical detecting unit 264 and the Mth channel optical detecting unit 265 are in accordance with the first reflected light 6, the (M−1)th channel optical detecting unit 264 and the Mth channel optical detecting unit 265 are input to the first combiner 291. When the output signals of the (M−1)th channel optical detecting unit 264 and the Mth channel optical detecting unit 265 are in accordance with the second reflected light 8, the (M−1)th channel optical detecting unit 264 and the Mth channel optical detecting unit 265 are input to the second combiner 292.

The signal combiner 290 receives output signals of the plurality of optical detecting units 261, 262, 263, 264, 265, 266, 267, and 268 through N input ports 211, 212, 213, 214, 215, 216, 217, and 218 corresponding to the N light detecting output ports 251, 252, 253, 254, 255, 256, 257, and 258. The N light detecting output ports and the N input ports may be electrically connected by N wires 201, 202, 203, 204, 205, 206, 207, and 208, respectively.

The plurality of switches 270 are provided in each of the N input ports 211, 212, 213, 214, 215, 216, 217, and 218 and selectively connect the N optical detecting units to the signal combiner 290. The plurality of switches 270 include the first channel switch 271, the second channel switch 272, the third channel switch 273 through the (M−1)th channel switch 274, the Mth channel switch 275 through the (N−2)th channel switch 276, the (N−1)th channel switch 277, and the Nth channel switch 278.

Switches of channels to which the first reflected light 6 is input electrically connect the optical detecting units of the corresponding channels and the first combiner 291 or electrically isolate the optical detecting units of the corresponding channels from the first combiner 291. Switches of channels to which the second reflected light 8 is input electrically connect the optical detecting units of the corresponding channels and the second combiner 292 or electrically isolate the optical detecting units of the corresponding channels from the second combiner 292.

As described above, since both the first reflected light 6 and the second reflected light 8 are input to the Mth channel optical detecting unit 265 with time difference, the Mth channel switch 275 electrically connects the Mth channel optical detecting unit 265 and the first and second combiners 291 and 292 or electrically isolates the Mth channel optical detecting unit 265 from the first and second combiners 291 and 292. For example, the M th channel switch 275 may be a two way switch having one input end and two output ends and the (M−1)th channel switch 274 may also be a two way switch having one input end and two output ends.

The controller 190 controls the N switches 270 so that the output signals of the plurality of optical detecting units are selectively input to a corresponding combiner of the signal combiner 290. The controller 190 controls the plurality of switches 270 based on whether an optical signal reflected from the target 40 is input or not.

Referring to FIG. 9, the laser beam output from the light source 110 is divided into the first irradiated light 5 and the second irradiated light 7 by the optical splitter 140 and the first irradiated light 5 and the second irradiated light 7 may be simultaneously irradiated onto the second unit region 42 and the sixth unit region 47 of the target 40. Referring to FIG. 10, the first and second reflected light components reflected from the second unit region 42 and the sixth unit region 47 of the target 40 may be respectively input to the second channel optical detecting unit 262 and the (N−1)th channel optical detecting unit 267.

The controller 190 closes the second channel switch 272 to input the output signal of the second channel optical detecting unit 262 to the first combiner 291 and closes the (N−1)th channel switch 277 to input the output signal of the (N−1)th channel optical detecting unit 267 to the second combiner 292. The controller 190 opens the remaining switches 271, 273, 274, 275, 276, and 278 so that the output signals of the optical detecting units 261, 263, 264, 265, 266, and 268 of the remaining channels are not input to the first and second combiners 291 and 292.

As described above, both the first reflected light 6 and the second reflected light 8 may be input to the (M−1)th and Mth channel optical detecting units 264 and 265 with time difference. The controller 190 controls the (M−1)th switch 274 so that the output signal of the (M−1)th channel optical detecting unit 264 is input to the first combiner 291 when the first reflected light 6 is input to the (M−1)th channel optical detecting unit 264 and the output signal of the (M−1)th channel optical detecting unit 264 is input to the second combiner 292 when the second reflected light 8 is input to the (M−1)th channel optical detecting unit 264. When both the first reflected light 6 and the second reflected light 8 are not input to the (M−1)th channel optical detecting unit 264, the (M−1)th channel switch 274 is opened so that the (M−1)th channel switch 274 is not connected to both the first and second combiners 291 and 292. The controller 190 also controls the Mth channel switch 275.

Since switch control of the controller 190 in accordance with the scan operation of the optical signal deflector 130 is the same as that of the controller 170 of the embodiment of FIG. 1, detailed description thereof will not be given. In addition, as described above, the first reflected light 5 reflected from one unit region of the target 40 may be input to a plurality of adjacent optical detecting units and the first reflected light components 5 sequentially reflected from various unit regions of the target 40 in a scan direction may be input to one light detecting region, which is the same with respect to the second reflected light 7.

The signal processor 180 may further include a plurality of rear end amplifiers 280 provided between output ends of the plurality of switches 270 and the signal combiner 290. The plurality of rear end amplifiers 280 include a first channel rear end amplifier 281, a second channel rear end amplifier 282, a third channel rear end amplifier 283 through (M−1)th channel rear end amplifiers 284A and 284B, Mth channel rear end amplifiers 285A and 285B through (N−2)th channel rear end amplifier 286, an (N−1)th channel rear end amplifier 287, and an Nth channel rear end amplifier 288. Since both the first and second optical signals 6 and 8 may be input to the (M−1)th and Mth channels as described above, one amplifier is provided in each of a front end of the first combiner 291 and a front end of the second combiner 292 by channel.

The plurality of rear end amplifiers 280 amplify an electrical signal input to the signal combiner 290 when corresponding switches are closed. It is possible to prevent the electrical signal from being reflected or distorted without being input to the signal combiner 290 by the plurality of rear end amplifiers 280 and to implement a highly sensitive optical receiver. The plurality of rear end amplifiers 280 may be low noise amplifiers. The plurality of rear end amplifiers 280 may be omitted as occasion demands.

Figure 8:
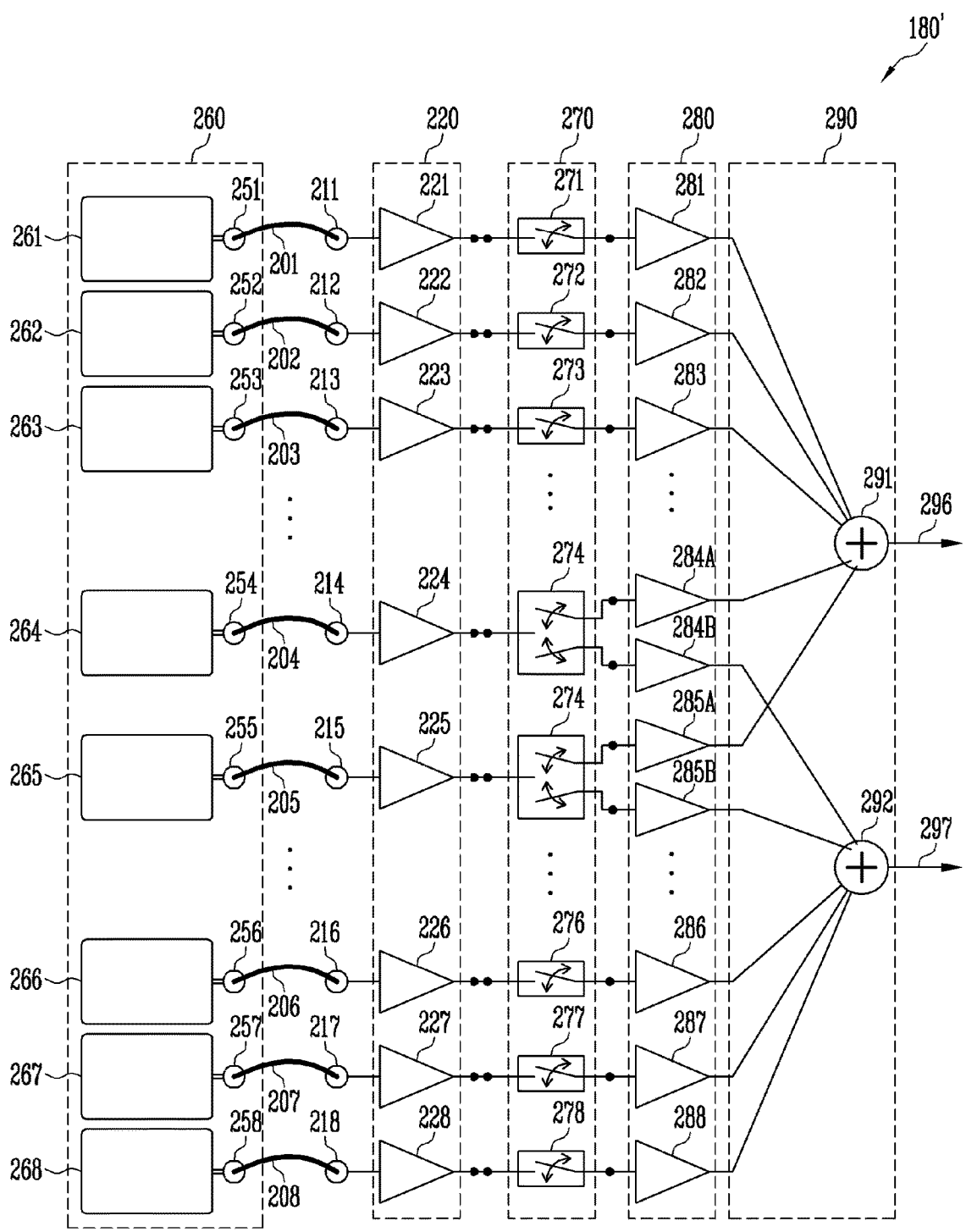
FIG. 8 is a block diagram of a signal processor according to another embodiment.

FIG. 8 is a block diagram of a signal processor 180' according to another embodiment. The signal processor 180' according to another embodiment further includes a plurality of front end amplifiers 220 electrically connected between the input ports 211, 212, 213, 214, 215, 216, 217, and 218 of the signal processor 180 of FIG. 7 and input ends of the plurality of switches 270. Noise may increase due to the switches 270. A signal to noise ratio may be reduced by adding the front end amplifiers 220.

The plurality of front end amplifiers 220 amplify electrical signals respectively input to the plurality of input ports. The plurality of front end amplifiers 220 may be low noise amplifiers. The plurality of front end amplifiers 220 reduce capacitance increased by the plurality of switches 270.

In the embodiment of FIG. 8, the plurality of front end amplifiers 220 and the rear end amplifiers 280 may be omitted as occasion demands. As occasion demands, the plurality of front end amplifiers 220 are provided and the rear end amplifiers 280 may be omitted.

Figure 11:
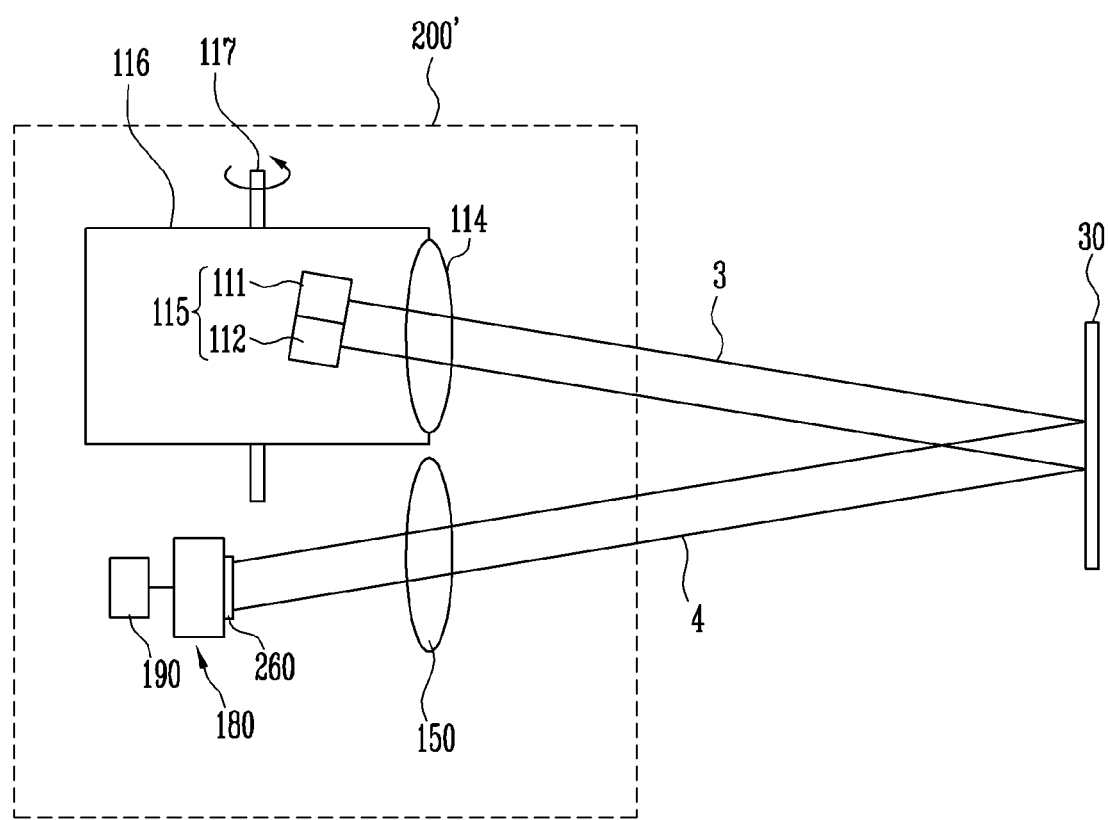
FIG. 11 is a block diagram of a laser radar according to another embodiment of the present invention.

FIGS. 11 and 12 are block diagrams illustrating a laser radar according to another embodiment of the present invention. The laser radar is seen from a side in FIG. 11 and is seen from above in FIG. 12. A laser radar 200' according to another embodiment of the present invention includes an optical transmitter and the optical receivers 150, 180, and 190. Since the optical receivers 150, 180, and 190 are described in detail with reference to FIGS. 6 through 10, detailed description thereof will not be given.

The optical transmitter includes a light receiving optical system 114, a plurality of light sources 115, and a rotating housing 116. The housing 116 accommodates the plurality of light sources 115 and has the light receiving optical system 114 fixed thereto. The plurality of light sources 115 include a first light source 111 and a second light source 112 linearly arranged up and down. The plurality of light sources 115 irradiate a plurality of laser beams 3 onto a target 30 through the light receiving optical system 114.

The housing 116 rotates about a rotating shaft 117 that runs in parallel up and down. The light receiving optical system 114 is fixed to an external surface of the housing 116 and rotates together with the housing 116. When the laser beams 3 are output from the first and second light sources 111 and 112, the housing 116 rotates so that the target 30 may be two-dimensionally scanned in a horizontal direction. For example, the target 30 of FIG. 12 may be two-dimensionally scanned from the left to the right.

An optical signal 4 reflected from unit regions of the target 30 is incident on the optical detector 260 through the light receiving optical system 150. The controller 190 controls the plurality of switches 270 of the signal processor 180 so that only an output signal of an optical detecting unit corresponding to a light receiving region that changes in accordance with a scan direction is input to the signal combiner 290. Since the plurality of light sources are provided, a plurality of electrical signals are output from the signal combiner. A method of controlling switches in an optical receiver when a plurality of reflected light components are simultaneously incident is described in detail in the embodiment of FIG. 6.

In the above-described configuration, even when the optical transmitter of the laser radar 200' rotates in order to scan the target, the optical receiver may change a light receiving region without mechanical movement by electrical switching. Therefore, it is possible to prevent stability and reliability from deteriorating due to the mechanical movement, to reduce a signal to noise ratio, and to prevent reflected light components of adjacent laser radars from interfering one another.

In a conventional rotating LIDAR, a transmitting unit and a receiving unit are assembled with one rotating module so that a size of a module increases. In addition, in the conventional rotating LIDAR, vertical resolution is increased by increasing the number of irradiated beams of the transmitting unit and the number of light detecting units of the receiving unit. Therefore, the size of the module also increases. In addition, in a module including various transmitting units and receiving units, since the transmitting units and the receiving units need to be optically aligned, manufacturing expenses increase.

According to the present invention, by the above-described configuration, since the optical receiver and the optical transmitter may be separate from each other and the optical receiver changes the light receiving region by the electrical switching without the mechanical movement, the module may be made small. In addition, since it is not necessary to optically align the optical transmitting units and the optical receiving units, manufacturing expenses are reduced.

In the embodiment of FIG. 11, the optical transmitter is rotary. However, the present invention is not limited thereto. The optical transmitter according to the present invention may have any beam scan configuration of any method. For example, an optical transmitter without mechanical movement may be implemented by applying a non-mechanical scan method such as liquid (LC) or optical phased array (OPA).

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An optical receiver comprising:
a plurality of optical detecting units configured to convert an optical signal reflected from a target into an electrical signal and to output the electrical signal;
a signal combiner configured to combine output signals of the plurality of optical detecting units;
a plurality of switches provided between the plurality of optical detecting units and the signal combiner, the plurality of switches being in one-to-one correspondence with the plurality of optical detecting units; and
a controller configured to control the plurality of switches so that the plurality of optical detecting units are selectively connected to the signal combiner based on a position of an incidence region of the optical signal,
wherein signals selected by the controller among the output signals are combined by the signal combiner,
wherein an optical detecting unit to which the optical signal reflected from the target is input is predetermined based on a scan direction, a scan speed, and a number of optical signals simultaneously irradiated onto unit regions of the target, and
wherein the controller controls the plurality of switches so that the predetermined optical detecting unit to which the optical signal reflected from the target is input is connected to the signal combiner and connection between remaining optical detecting units and the signal combiner is blocked.

2. The optical receiver of claim 1, further comprising a plurality of amplifiers connected to at least one of front ends and rear ends of the plurality of switches.

3. The optical receiver of claim 1, wherein the signal combiner outputs as many electrical signals as optical signals simultaneously incident on the plurality of optical detecting units.

4. A laser radar comprising:
an optical transmitter configured to irradiate an optical signal and to scan unit regions of a target; and
an optical receiver configured to detect optical signals reflected from unit regions of the target,
wherein the optical receiver comprises:
a plurality of optical detecting units configured to convert the optical signals reflected from the unit regions of the target into electrical signals and to output the electrical signals;
a signal combiner configured to combine output signals of the plurality of optical detecting units;
a plurality of switches provided between the plurality of optical detecting units and the signal combiner, the plurality of switches being in one-to-one correspondence with the plurality of optical detecting units; and
a controller configured to control the plurality of switches so that the plurality of optical detecting units are selectively connected to the signal combiner based on a position of an incidence region of the optical signal,
wherein signals selected by the controller among the output signals are combined by the signal combiner,
wherein an optical detecting unit to which the optical signal reflected from the target is input is predetermined based on a scan direction, a scan speed, and a number of optical signals simultaneously irradiated onto the unit regions of the target, and
wherein the controller controls the plurality of switches so that the predetermined optical detecting unit to which the optical signal reflected from the target is input is connected to the signal combiner and connection between remaining optical detecting units and the signal combiner is blocked.

5. The laser radar of claim 4, wherein the optical transmitter sequentially irradiates the unit regions of the target in accordance with a scan operation.

6. The laser radar of claim 4, wherein the optical receiver further comprises a plurality of amplifiers connected to at least one of front ends and rear ends of the plurality of switches.

7. The laser radar of claim 4, wherein the plurality of optical detecting units respectively comprise photodiodes.

8. The laser radar of claim 4,
wherein the optical transmitter simultaneously outputs a plurality of optical signals to scan the unit regions of the target, and
wherein the signal combiner outputs as many electrical signals as optical signals simultaneously output from the optical transmitter.

9. The laser radar of claim 4, wherein the controller determines a channel for connecting, from the plurality of optical detecting units, an optical detecting unit corresponding to the position of the incidence region of the optical signal to the signal combiner, based on a time zone of a period of time during which the beam is irradiated onto the target, and connects only the optical detecting unit corresponding to the position of the incidence region of the optical signal to the signal combiner with the determined channel.

10. The laser radar of claim 4, wherein an optical detecting unit of the plurality of optical detecting units comprises a circular light receiving region formed on a substrate and divided into multiple separate regions, each of the multiple separate regions being connected to a respective light detecting output port.

* * * * *